United States Patent [19]

Chamberlin et al.

[11] Patent Number: 4,932,703
[45] Date of Patent: Jun. 12, 1990

[54] TRUCK BED EXTENSION

[76] Inventors: John M. Chamberlin, 2800 Dunsinane Rd., Pensacola, Fla. 32503; John R. Chamberlin, 1767 Ensenada Dos, Pensacola Beach, Fla. 32561

[21] Appl. No.: 642,913

[22] Filed: Aug. 21, 1984

[51] Int. Cl.$^5$ .............................................. B60P 3/00
[52] U.S. Cl. ................ 296/26; 224/42.03 R; 224/42.44
[58] Field of Search .............. 296/26, 27, 37.16, 57 R; 224/42.03 R, 42.05, 42.07, 42.43, 42.44, 42.45 R; 248/316.7, 231.8

[56] References Cited

U.S. PATENT DOCUMENTS

| | | | |
|---|---|---|---|
| 150,695 | 5/1874 | Martin | 296/43 |
| 1,865,365 | 6/1932 | Foote | 224/42.44 |
| 1,886,911 | 11/1932 | Schulman | 224/42.45 R |
| 2,456,553 | 12/1948 | Churchill | 248/231.8 |
| 2,570,802 | 10/1951 | Hatteburg | 224/42.45 R |
| 2,777,625 | 1/1957 | Kronhaus et al. | 224/42.43 |
| 3,460,864 | 8/1969 | Piercy | 296/43 |

Primary Examiner—Dennis H. Pedder
Attorney, Agent, or Firm—John E. Benoit

[57] ABSTRACT

A bed extension for a pick-up comprising a load-carrying beam substantially parallel to the rear of the truck bed supported outwardly of the truck bed by means of suspension cables. The suspension cables are attached to the load carrying beams at one end and to a rigid member of the truck body or frame at the other end and pass over vertical stakes which fit into existing or installed rear stake compartments of the pick-up. The load-carrying beam is stabilized by truss members which are secured at one end to the load-carrying beam and at the other end to the rear bumper or rear bumper support. The bed extension is removable or collapsible and is compactly secured together in its disassembled condition so as to be easily stored.

13 Claims, 3 Drawing Sheets

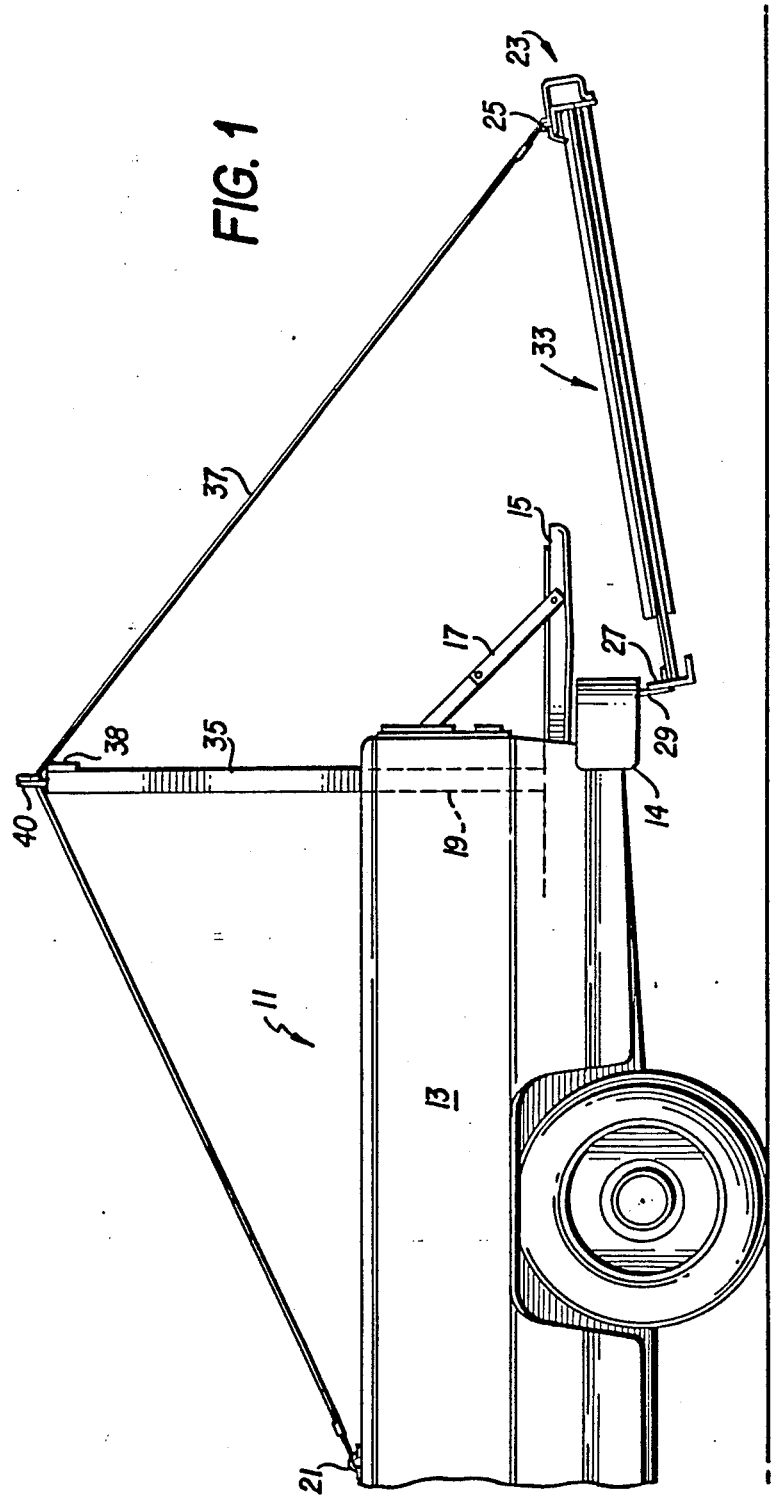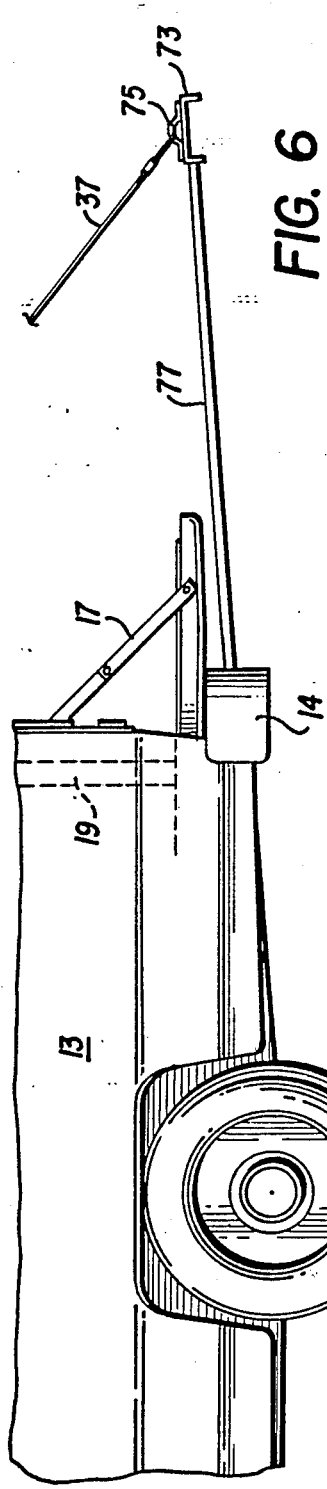

TRUCK BED EXTENSION

The present invention relates broadly to an extension for a pick-up truck which extends rearwardly from the bed of the truck and more particularly to such an extension which is supported by means of suspension relative to the bed of the truck.

BACKGROUND OF THE INVENTION

The pick-up truck, now common in the United States, has had a phenomenal growth over the past dozen years due to its general utility. Although originally a vehicle aimed for use by farmers, contractors and the like for nearly full-time duty as a light truck, the combination of the suburbanization of America with a growth and affluence which supports two or more vehicles to a family has indeed made the pick-up become a common general vehicle. It is now called upon for a wide variety of uses, often chores not intended in the original design of the pick-up truck. One of these chores is the transportation of fairly long lengths of commonly used materials such as lumber, plastic pipe, conduit, etc. which are often more than twice the length of the flat bed portion of the pick-up such that the center of gravity of such material would be outside the rear of the truck, thus resulting in an unstable condition when loaded.

While the manufacturers of pick-up trucks have partially recognized this need by providing trucks of two basic lengths, that is the standard bed and the so-called long bed, even the long bed length is inadequate for truly long loads. The long bed truck also is obviously considerably more expensive than the standard length bed and in many instances the length is not often needed. However, the more expensive long length bedded truck is often purchased in anticipation of the requirements not foreseen at the time of purchase.

Accordingly, it is an object of this invention to provide a substantially simple solution to the occasional carrying of extended loads in a pick-up truck.

It is a further object of this invention to provide a means for carrying extended loads in a short bedded truck.

Another object of the invention is to provide an extension for a standard bed pick-up truck in order to obviate the need for the purchase of a long bedded truck.

Yet another object of the invention is to provide an extension which is removable from the truck and readily stored when not in use but which is simple to mount and utilize when needed.

A further object of the invention is to provide a removable extension for a truck which is supported by means of suspension relative to the bed of the truck.

The need for a temporary bed extension for pick-up trucks and even standard trucks is well recognized. As early as 1921, T. Devencenzi, in U.S. Pat. No. 1,366,771 disclosed an extension frame for a truck which consisted of a plurality of rods and tubes which would telescope and bear a longer load via cantilever support, but with the addition of trailer wheels where necessary. A less awkward solution is set forth by H. Vuori, U.S. Pat. No. 2,468,579 wherein he proposes an extendable platform attached to a pair of rails and a pair of bars extending rearward. Such a system requires redesign of the truck frame members and, thus, was not applicable to existing trucks on one hand and ended up being a cantilevered load on the other hand. M. O. Eggum, U.S. Pat. No. 2,729,499 also proposes a cantilevered rod and tube telescoping design, but the mechanism lay inside the usable truck body volume partially when in use and completely when not in use. Alternately, the telescoping rod and tube device could be stored under the truck body platform, as in the manner of the T. Devencenzi patent with a chain or other "retractable interconnecting member" secured to the truck for "retaining the support frame in its outwardly extended position but not as a major support for the load".

A. S. Cardini, U.S. Pat. No. 2,712,470 proposes a solution similar to that of the Vuori patent except that the telescoping rod and tube are located at the top of the truck carrying frame and the tube becomes an integral unit of the carrying unit frame side walls. The extended load further is supported entirely by cantilever construction. J. M. Tillery, U.S. Pat. No. 4,023,850 discloses a horizontal extension panel structure substantially coextensive with the tailgate in its horizontal position. Brace arms are supplied to help support the cantilevered load, and vertical braces are supplied to rigidize the structure, and transversely located downwardly directed flanges are provided between the tailgate and the edge of the pick-up truck load for securing the rigid structure positionally. The entire rigid panel structure is removable for storage elsewhere.

BRIEF DESCRIPTION OF THE DRAWINGS

FIG. 1 is a partial schematic side elevation view of a pick-up truck illustrating the preferred embodiment of the present invention mounted thereon;

FIG. 6 is a partial side elevational view of a pick-up truck using a modification of the present invention;

SUMMARY OF THE INVENTION

Figure 1A:
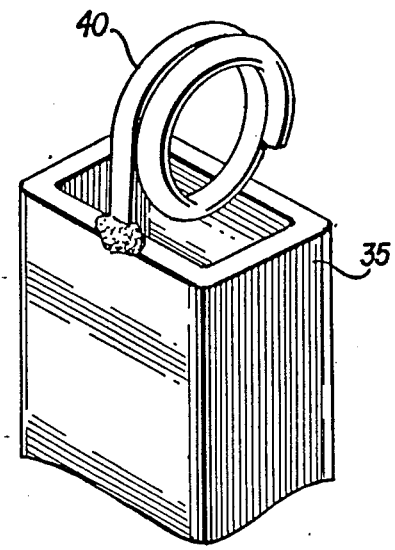
FIG. 1a is a partial perspective view of the upper end of one of the stakes used in FIG. 1.

The present invention provides a bed extension for a pick-up comprising load-carrying beams substantially parallel to the rear of the truck bed and supported outwardly of the truck bed by means of suspension cables. The suspension cables are attached to the load carrying beam at one end and to a rigid member of the truck body or frame at the other end and pass over vertical stakes which fit into existing or installed rear stake compartments of the pick-up. The load carrying beam is stabilized by truss members which are secured at one end to the load carrying beam and at the other end to the rear bumper or the rear bumper support. The bed extension is removable or collapsible and is compactly secured together in its disassembled or collapsed condition so as to be easily stored and transported.

Turning now to FIG. 1, there is shown a partial schematic elevation view of bed 11 of a pick-up truck having standard side panels 13 and tailgate 15. The tailgate is supported in its downward position in its usual manner by hinge brace 17. Also shown in dotted lines are standard stake wells 19 which are normally built into standard pick-up vehicles. Also shown are cleats 21 which, if not provided in the manufacture of the pick-up truck may be added by means of welding or the like.

In order to support an extended load which extends to the rear of a pick-up, there is provided a load carrying beam 23 having hooks 25 mounted thereon. It is to be understood that several such hooks are to be used in the practice of the invention. Base 27 has secured thereto strap 29 and strap hanger 31 (FIG. 4) for purposes which will become apparent as the description proceeds. Hinged trusses extend on either end of load carrying beam 23 and are secured to base 27. Stake 35 is shown removably inserted in stake wells 19 and extend vertically above the bed of the pick-up truck and also well above the side walls 13. It is to be understood that a stake is also inserted in the opposite stake well, and the two stakes are secured together by means such as stake stabilizer 38 which may be bolted to each of the stakes and extends therebetween. A cable 37 is secured at one end to hook 25 on load carrying beam 23 and passes upwardly over the upper end of stakes 35 and is secured to cleats 21. An identical cable passes over the other stake in the same manner. It is to be understood that in the description of this invention, the term "cable" includes any flexible cable structure whether it be in the form of a woven wire, chain link or even hinged sections of rods of metal so long as it provides the flexibility to provide its suspension support function. It is preferred that the beam be supported such that its upper surface lies substantially in the plane of the surface of the truck bed.

FIG. 1a discloses one means for the holding cable 37 in place on top of the stake. In this particular embodiment, pigtail 40 is welded to the inner portion of stake 35 and extends thereabove so as to provide a loop through which the cable can be threaded.

Figure 3:
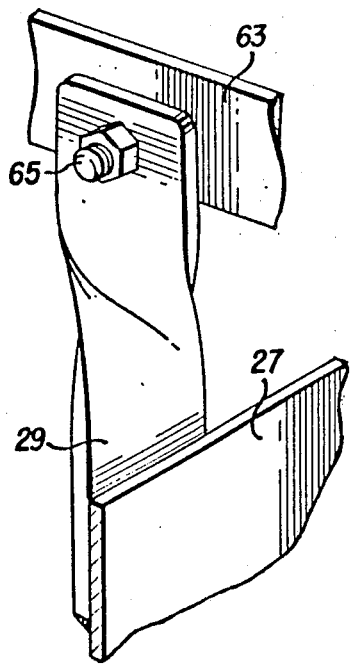
FIG. 3 is a partial enlarged view of the means for mounting the structure of claim 1 to the bumper brace of the truck.
Figure 2:
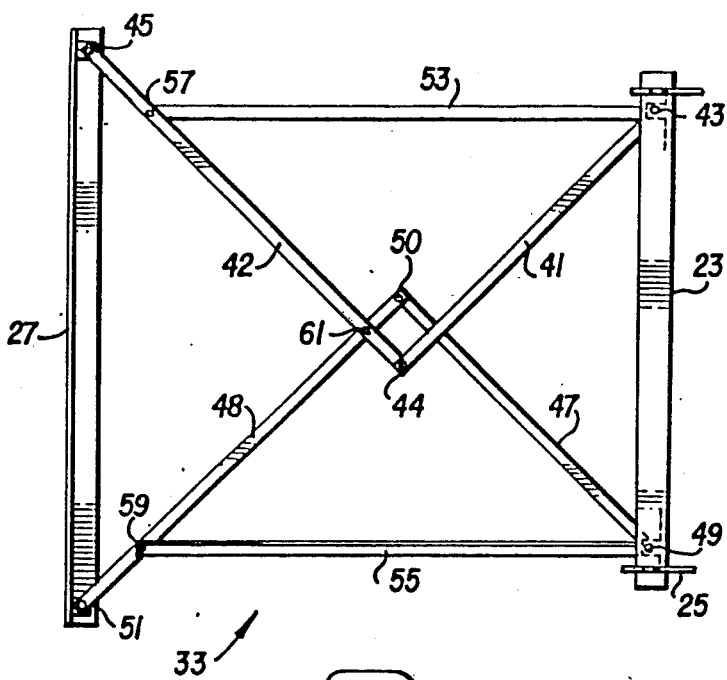
FIG. 2 is a plan view of the structure of FIG. 1 without the extension cables.

FIG. 2 is a plan view of the extension unit of FIG. 1 in position ready for use. Load carrying beam 23 is formed of an angle iron and a similar angle iron serves as base 27. The base is mounted to bumper support 63 by means of strap 29 and bolt 65, FIG. 3, with strap 29 being welded to base 27. Again, a further strap is provided at the opposite end of base 27.

FIG. 2 discloses the preferred embodiment of the truss structure wherein load beam 23 is connected to base 27 through a series of collapsible structures. Hinged truss 41 is pivoted to beam 23 by pin 43 while truss 42 is hinged to base 27 by pin 45 with the trusses 41 and 42 being hinged together at their outer ends by pin 44. In a like manner, truss 47 is hinged to beam 23 by pin 49 and truss 48 is hinged to base 27 by pin 51 with the outer ends of trusses 47, 48 being hinged by pin 50. Trusses 53 and 55, which are angle irons, are connected at one end to beam 23 by pins 43 and 49 and are secured to trusses 42 and 48 by means of removable pins 57 and 59. Additionally, truss 42 and truss 48 are secured together by means of removable pin 61.

Figure 4:
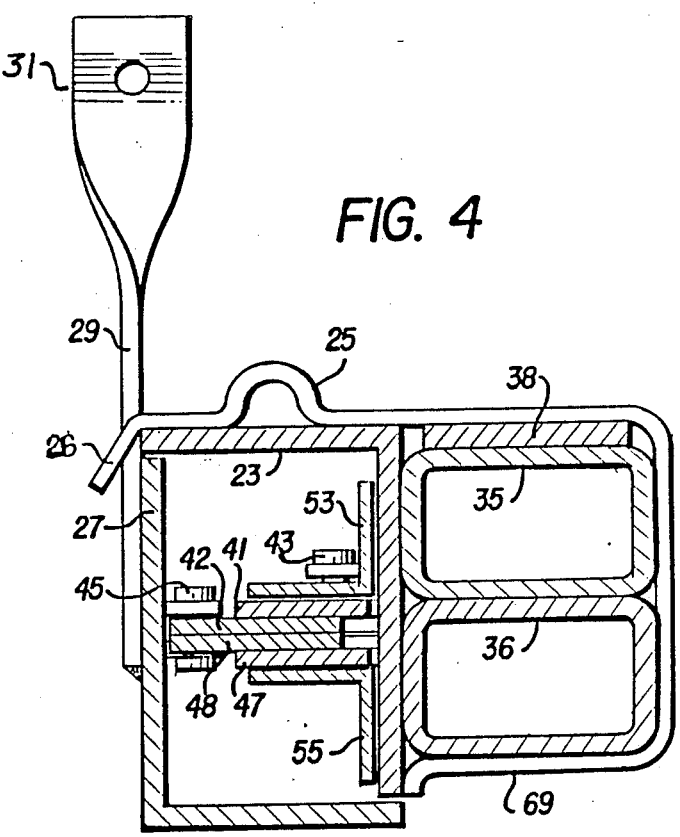
FIG. 4 is a sectional view of the component parts of the support structure of FIGS. 1 and 2 when in their disassembled or folded storage package.

When it is desired to store the structure, pins 57, 59 and 61 are removed and the entire structure may be collapsed together into a collapsed ,position as shown in FIG. 4. As can be seen, beam 23 and base 27 are mated so as to provide a container for the various truss members as shown. Beam 23 has welded thereto a plate including a C-shaped section 69, hook 25 and flange 26. The various trusses are shown in their collapsed condition. Stakes 35 and 36 and stabilizer 38 are stored within C-shaped section 69. Mating structure exists at the opposite end of beam 23. Enough play exists in the structure to allow flange 26 to pass over base 27 and drop into the position shown so as to secure the package.

Figure 5:
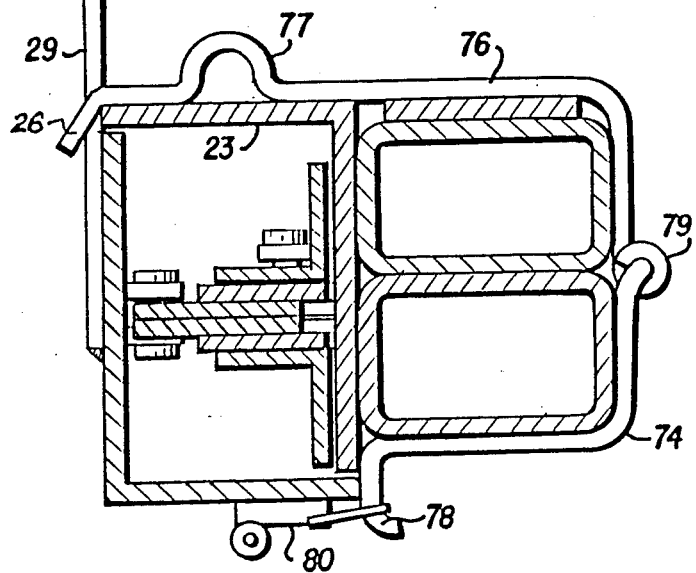
FIG. 5 is a modification of the disassembled and folded storage package of FIG. 4.

FIG. 5 shows a further configuration which may be used in order to store the elements as disclosed in FIGS. 1 and 2. As can be seen, the configuration is similar to FIG. 4. The folded truss structure is the same and, therefore, not shown. In this embodiment, plate 76 includes hook 77 and is welded to beam 23 as indicated and terminates at hinge 79. Plate 74 is hinged at 79 and terminates in lip 78. Toggle clamp 80 including a lock is welded to base 27 so as to releasably lock plate 74 in place as shown.

Figure 7:
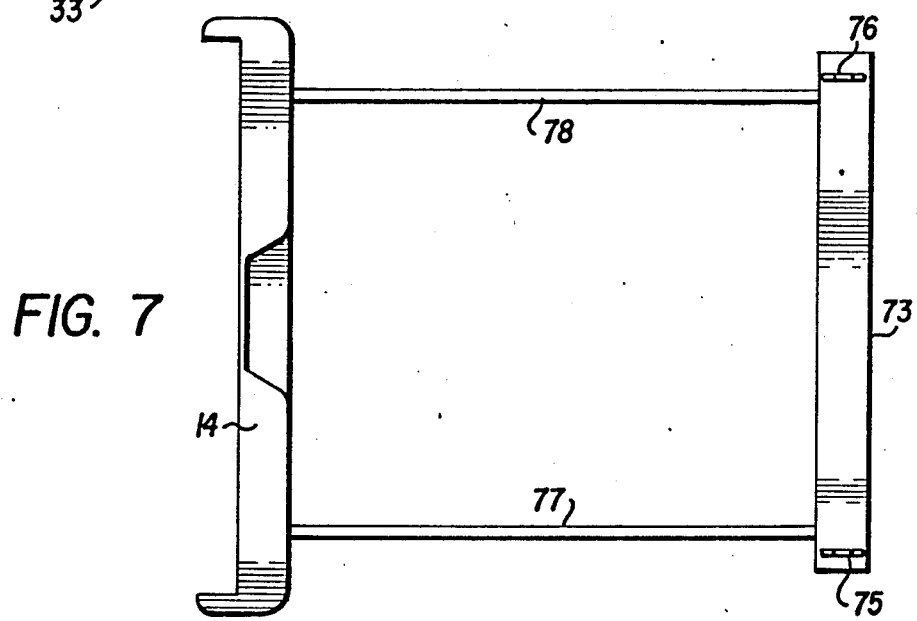
FIG. 7 is a plan view of the base structure of FIG. 6 mounted to the pick-up truck.

Referring to FIGS. 6 and 7, FIG. 6 is a partial schematic view showing a modified structure for use as indicated hereinabove. In this case, load-carrying beam 73 still has attached thereto hooks 75 and 76 for attaching cables 37. The structure on the truck bed remains the same as that described relative to FIG. 1. Referring to FIG. 7, a pair of trusses 77 and 78 are secured at one end to load-carrying beam 73 and at the other end to the bumper 14 by means such as bolts or the like (not shown).

Figure 8:
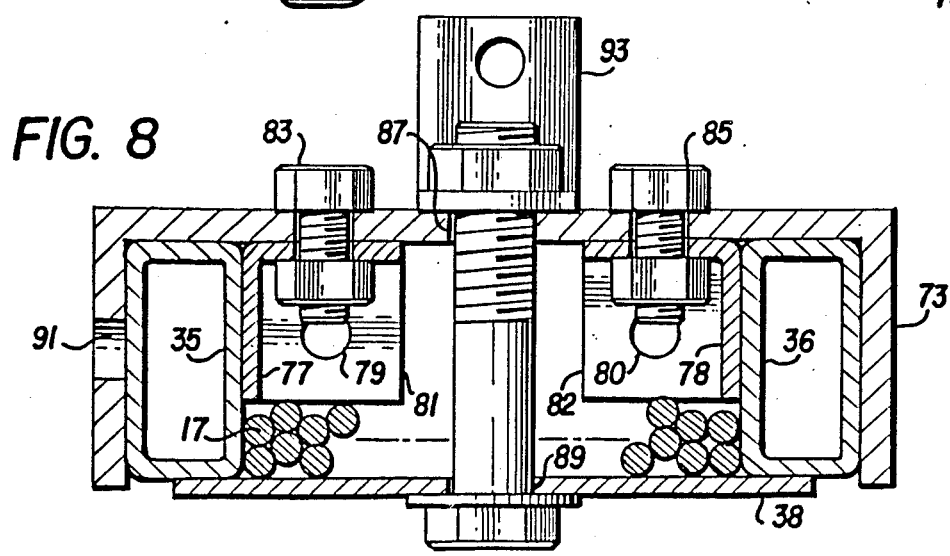
FIG. 8 is a sectional view showing the disassembled parts of the support of FIGS. 6 and 7 in a storage package.

Again, this structure is removable and may be stored as shown in FIG. 8. In this structure, load-carrying beam 73 is a channel iron. As can be seen, stakes 35 and 36 are adjacent to each of the inner ends of the channel formed by load carrying beam 73 while trusses 77 and 78 are secured to beam 73 by means of bolts 83 and 85. As will be noted, end walls 81 and 82 of trusses 77 and 78 have boreholes 79 and 80 therein at either end. Since is a sectional view only two boreholes are shown. This permits mating with boreholes in the bumper and the attachment to the bumper by means of a further set of bolts located at the other end of beam 73. Again, straps 93 are welded to support beam 73 so as to provide a means for attachment to the bumper support frame. Obviously, two such straps exist with only one being shown in the cross sectional view.

When rigged for use, the structure of this invention uniquely utilizes several design features that are inherent in any pick-up to maximum advantage, allowing the components of the extension kit to be extremely light in weight. As an example, if a full 500 lb. load was imposed on the center of the load bearing beam 23 and if the suspension cables were attached to the beam 4' apart, and the extension truss members 77, 78 were 5' long with a vertical stakes 5' high, then the simplest commercial structural channel beam of only 5"×1¾" would easily withstand the load. Also, the extension truss members would experience only a 250 lb. compression or column load which would require a 1"×1" steel angle iron and the force of each truss against the bumper would only be that same 250 lbs. The tension on each suspension cable would be only 354 lbs. which is an extremely light load even for a 3/16" cable. In practice, these individual components would be designed to withstand several times such forces. Even so, the components would be light enough and small enough to be capable of being stored as an assembly in conjunction with either bumper. High stress cantilever construction is avoided and no forces are imposed on the truck structure even approaching its design limitations. The total weight of the light structure of this invention as described in the above example is only about 55 lbs., which is well within the load carrying capacity of any pick-up's bumper, these being designed to carry "tongue weights" of trailers at 200 lbs. and over. Hence, assembled storage in conjunction with the bumper is reasonable and practical.

It is noted that small, economical pick-up trucks sometimes do not come with stake wells. They do however, have room for such stakes in the rear corners of the bed and stake wells can readily be created by bolting on properly shaped forms.

It is noted that the bumper straps could be custom welded to the base for individual truck structure. Various modifications could be used within the concept of the invention itself such as using a tube as a load beam and storing the individual components within its confines, or designing a unit with members slightly longer than the width of the truck yet shorter than the bed length and storing this assembly in the bed lengthwise. Accordingly, the invention is to be limited only by the scope of the following claims.

What is claimed is:

1. Bed extension apparatus for a truck having a bed, bumper support and rear stake compartments on opposite sides of said bed comprising
   a load-carrying beam;
   at least two suspension cables;
   means for removably securing one end of said cables to said load carry beam and the other ends of said cables to said truck forward of said rear stake compartments;
   stakes removably mounted in and extending upwardly from each of said stake compartments;
   guide means at the outer end of each of said stakes for maintaining said cables in a position at the top of said stakes whereby said stakes support said cables in compressive columnar load and intermediate the ends of said cables;
   a plurality of truss members; and
   means for interconnecting said bumper support, said truss members and said load-carrying beam so that said load-carrying beam can be secured in an extended load-carrying position rearwardly of said bed or in a storage position.

2. The apparatus of claim 1 further comprising means for securing said load-carrying beam, said cables, said stakes and said trusses together so as to form a compact unit when in said storage position.

3. The apparatus of claim 2 further comprising means for securing said storage unit to said bumper support.

4. The apparatus of claim 1 wherein each of said guide means comprises a pigtail through which said cables pass.

5. The bed extension of claim 1 wherein the top of said beam is substantially level with the truck bed when in said extended position.

6. The apparatus of claim 1 wherein said truss members are removably mounted for storage.

7. The apparatus of claim 1 wherein said load-carrying beam, said stakes and said truss members are of a length less than the width of said truck bed.

8. The apparatus of claim 1 further comprising a stabilizer secured between said stakes.

9. The apparatus of claim 1 further comprising
   a base member; and
   a rigid strap secured between said base member and said bumper support for supporting said base member.

10. The apparatus of claim 9 wherein said truss members are collapsible against said base member.

11. The apparatus of claim 10 wherein said load carrying beam and said base member mate so as to provide a compartment for said truss members in said collapsed position.

12. The apparatus of claim 10 further comprising means secured to said load carrying beam for supporting said stakes in said collapsed condition.

13. The apparatus of claim 1 further comprising a bumper secured to said bumper support.

* * * * *